(12) United States Patent
Zhu

(10) Patent No.: US 11,392,140 B2
(45) Date of Patent: Jul. 19, 2022

(54) TWO INERTIAL MEASUREMENT UNITS AND GPS BASED LOCALIZATION SYSTEM FOR AN AUTONOMOUS DRIVING TRUCK

(71) Applicant: Baidu USA LLC, Sunnyvale, CA (US)

(72) Inventor: Fan Zhu, Sunnyvale, CA (US)

(73) Assignee: BAIDU USA LLC, Sunnyvale, CA (US)

(*) Notice: Subject to any disclaimer, the term of this patent is extended or adjusted under 35 U.S.C. 154(b) by 686 days.

(21) Appl. No.: 16/289,117

(22) Filed: Feb. 28, 2019

(65) Prior Publication Data

US 2020/0278692 A1 Sep. 3, 2020

(51) Int. Cl.
 *G05D 1/02* (2020.01)
 *G01S 19/47* (2010.01)
 *G01S 17/86* (2020.01)

(52) U.S. Cl.
 CPC ............ *G05D 1/0278* (2013.01); *G01S 17/86* (2020.01); *G01S 19/47* (2013.01); *G05D 1/027* (2013.01); *G05D 1/0238* (2013.01); *G05D 2201/0213* (2013.01)

(58) Field of Classification Search
 CPC ....... G05D 1/027–0278; G05D 1/0238; G05D 2201/0213; G01S 17/86; G01S 19/47
 See application file for complete search history.

(56) References Cited

U.S. PATENT DOCUMENTS

2019/0163201 A1* 5/2019 Jensen .................... G01S 19/53

* cited by examiner

*Primary Examiner* — Calvin Cheung
(74) *Attorney, Agent, or Firm* — Womble Bond Dickinson (US) LLP

(57) ABSTRACT

In one embodiment, a method of operating an autonomous driving truck includes receiving location data from a first inertial measurement unit, a first global positioning system, a second inertial measurement unit, and a second global positioning system at a planning module of the autonomous driving truck. The first inertial measurement unit and the first global positioning system are attached to a cabin of the autonomous driving truck and the second inertial measurement unit and the second global positioning system are attached to a body structure of the autonomous driving truck in which the body structure extends away from the cabin. The method further includes receiving location data from the second inertial measurement unit and the second global positioning system at a control module of the autonomous driving truck and controlling the autonomous driving truck based on the received location data at the planning and control modules.

21 Claims, 7 Drawing Sheets

US 11,392,140 B2

TWO INERTIAL MEASUREMENT UNITS AND GPS BASED LOCALIZATION SYSTEM FOR AN AUTONOMOUS DRIVING TRUCK

TECHNICAL FIELD

Embodiments of the present disclosure relate generally to operating autonomous vehicles. More particularly, embodiments of the disclosure relate to operating an autonomous driving truck.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. However, conventional motion planning operations estimate the difficulty of completing a given path mainly from its curvature and speed, without considering the differences in features for different types of vehicles. Same motion planning and control is applied to all types of vehicles, which may not be accurate and smooth under some circumstances.

Vehicles such as a truck have a very strong suspension system which is very different from the suspension system of a passenger car. In one case, sensors such as an inertial measurement unit and a global positioning system may be mounted on the cabin of a truck. However, due to the strong suspension of a truck, the cabin of the truck may undesirably roll and/or pitch relative to the truck's body especially when turning abruptly on a road or coming to an abrupt stop from a relatively high speed. In such circumstances, the sensors on the cabin may provide location data which may not accurately coincide with the location/position of the body of the truck which requires control (for example, during a turning operation). For example, when the truck is turning right, the cabin may swing to the left side but the body of the truck is in the middle of the lane. If the inertial measurement unit and the global positioning system are mounted on the cabin, the autonomous driving system will consider that the truck has an error to the left and correct it to the opposite way which may not be desirable.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
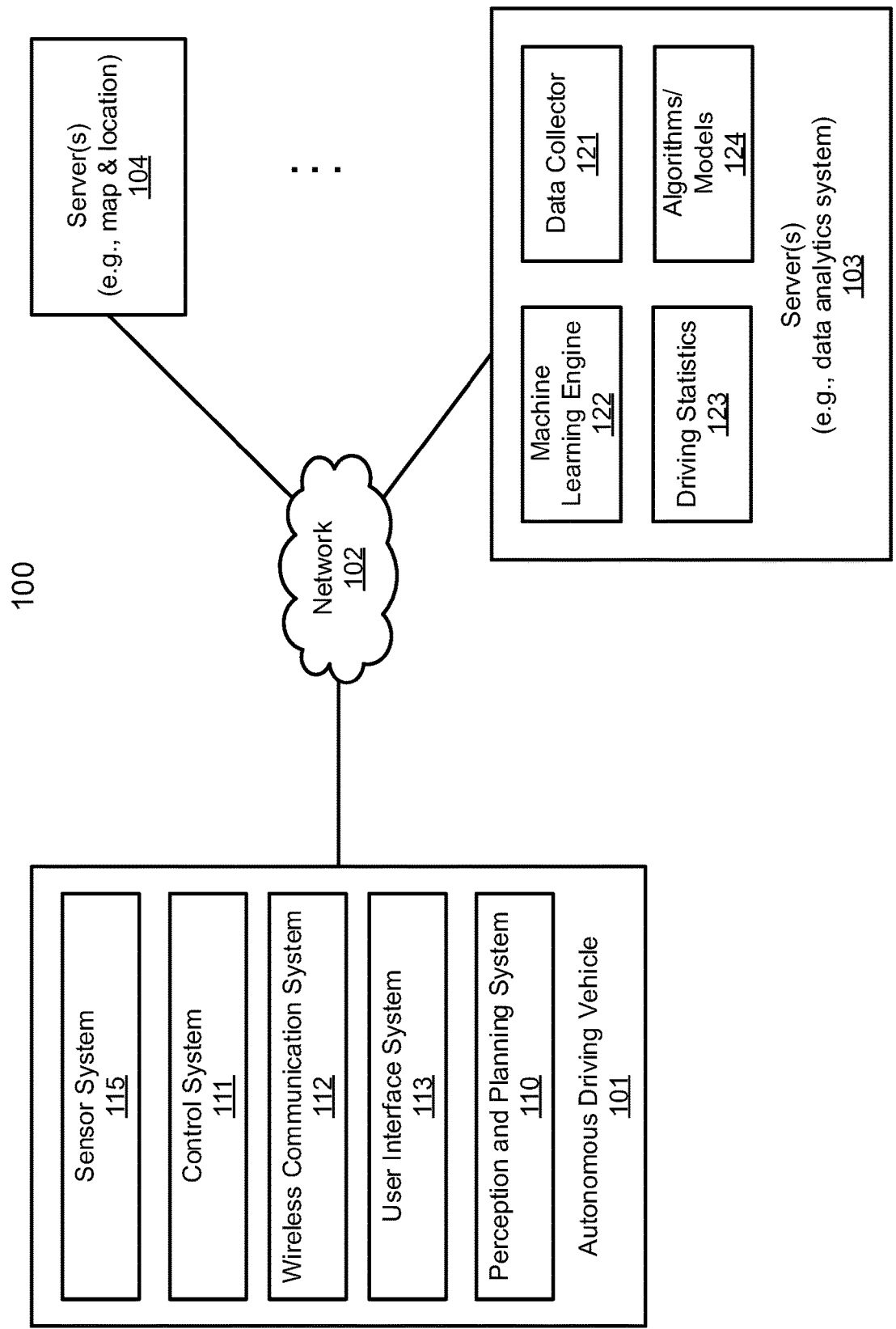
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, a computer-implemented method for operating an autonomous driving truck includes receiving location data from a first inertial measurement unit, a first global positioning system, a second inertial measurement unit, and a second global positioning system at a planning module of the autonomous driving truck. The first inertial measurement unit and the first global positioning system are attached to a cabin of the autonomous driving truck and the second inertial measurement unit and the second global positioning system are attached to a body structure of the autonomous driving truck in which the body structure extends away from the cabin. The method further includes receiving location data from the second inertial measurement unit and the second global positioning system at a control module of the autonomous driving truck and controlling the autonomous driving truck based on the received location data at the planning and control modules.

According to one embodiment of the invention, first location data is generated based on sensor data obtained from a first inertial measurement unit (IMU) and a first global positioning system (GPS) unit mounted on a first location of the autonomous driving truck. Second location data is generated based on sensor data obtained from a second IMU and a second GPS unit mounted on a second location of the autonomous driving truck. The first location and the second location are different. A trajectory is planned based on the first location data and the second location data. Planning and control data representing the trajectory is generated as a result. The autonomous driving truck is controlled according to the trajectory, including issuing various control commands (e.g., throttle, brake, steering control commands) based on the planning and control data, and further in view of the second location data.

In one embodiment, the first IMU and the first GPS unit are attached to a cabin of the truck, and the second IMU and second GPS unit are attached to a body structure of the truck. Specifically, for example, the first IMU and the first GPS unit are mounted on the top portion of the cabin, while the second IMU and second GPS unit are mounted on a base platform of the truck. A perception process is performed to perceive a driving environment surrounding the truck based on sensor data obtained from a variety of sensors, such as a LIDAR device, a camera, and/or a RADAR device, including perceiving one or more obstacles. For each of the obstacles, a relative location of the obstacle relative to the truck is determined based on the first location data based on the first IMU and first GPS unit. The trajectory is generated in view of the locations of the obstacles.

FIG. 1 is a block diagram illustrating an autonomous vehicle network configuration according to one embodiment of the disclosure. Referring to FIG. 1, network configuration 100 includes autonomous vehicle 101 (e.g., an autonomous driving truck to be described in more detail below) that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
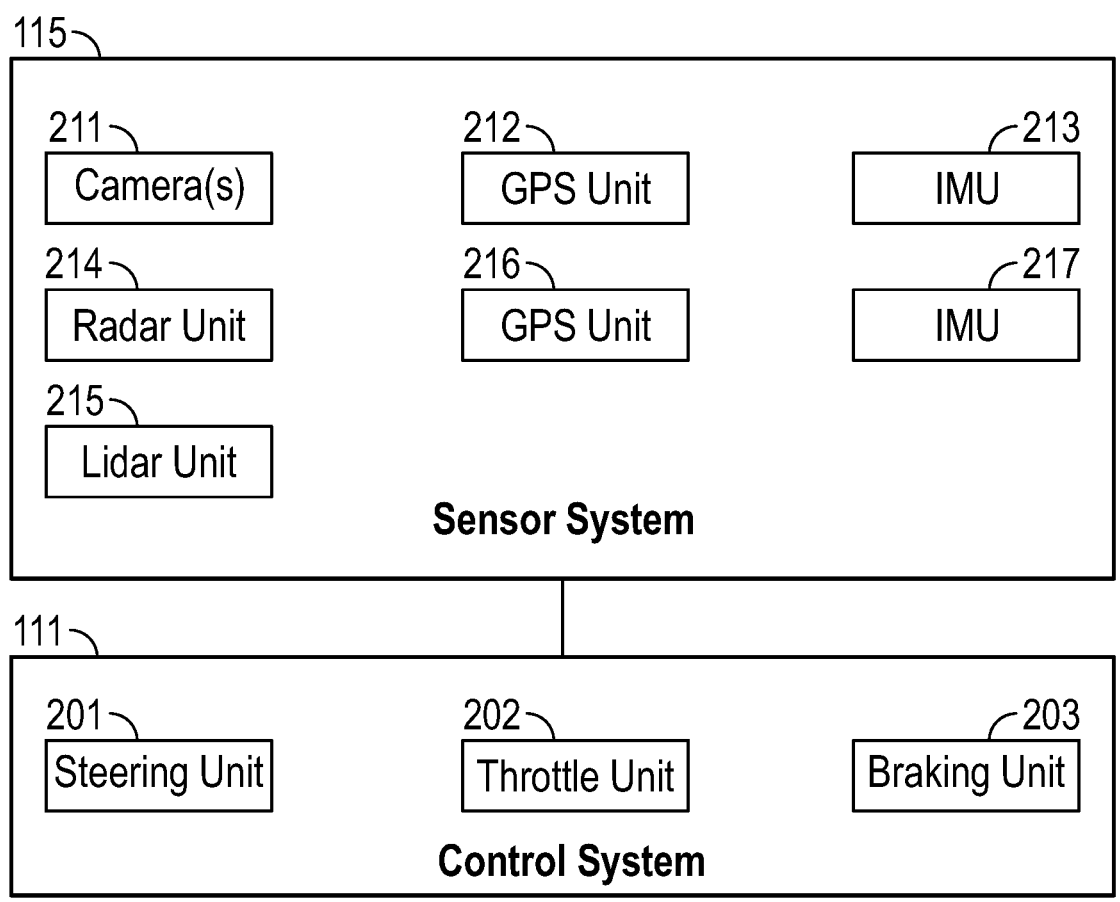
FIG. 2 is a block diagram illustrating an example of an autonomous vehicle according to one embodiment.

Referring now to FIG. 2, in one embodiment, sensor system 115 includes, but it is not limited to, one or more cameras 211, a first global positioning system (GPS) unit 212, a first inertial measurement unit (IMU) 213, radar unit 214, a light detection and range (LIDAR) unit 215, a second GPS unit 216, and a second IMU 217. GPS systems 212, 216 may each include a transceiver operable to provide information regarding the position of the autonomous vehicle. IMU units 213, 217 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. Algorithms 124 may include an algorithm to combine and utilize dual IMUs and GPS units for different purposes such as perception, planning, and control phases. Algorithms 124 can then be uploaded on ADVs to be utilized during autonomous driving in real-time.

Figure 3A:
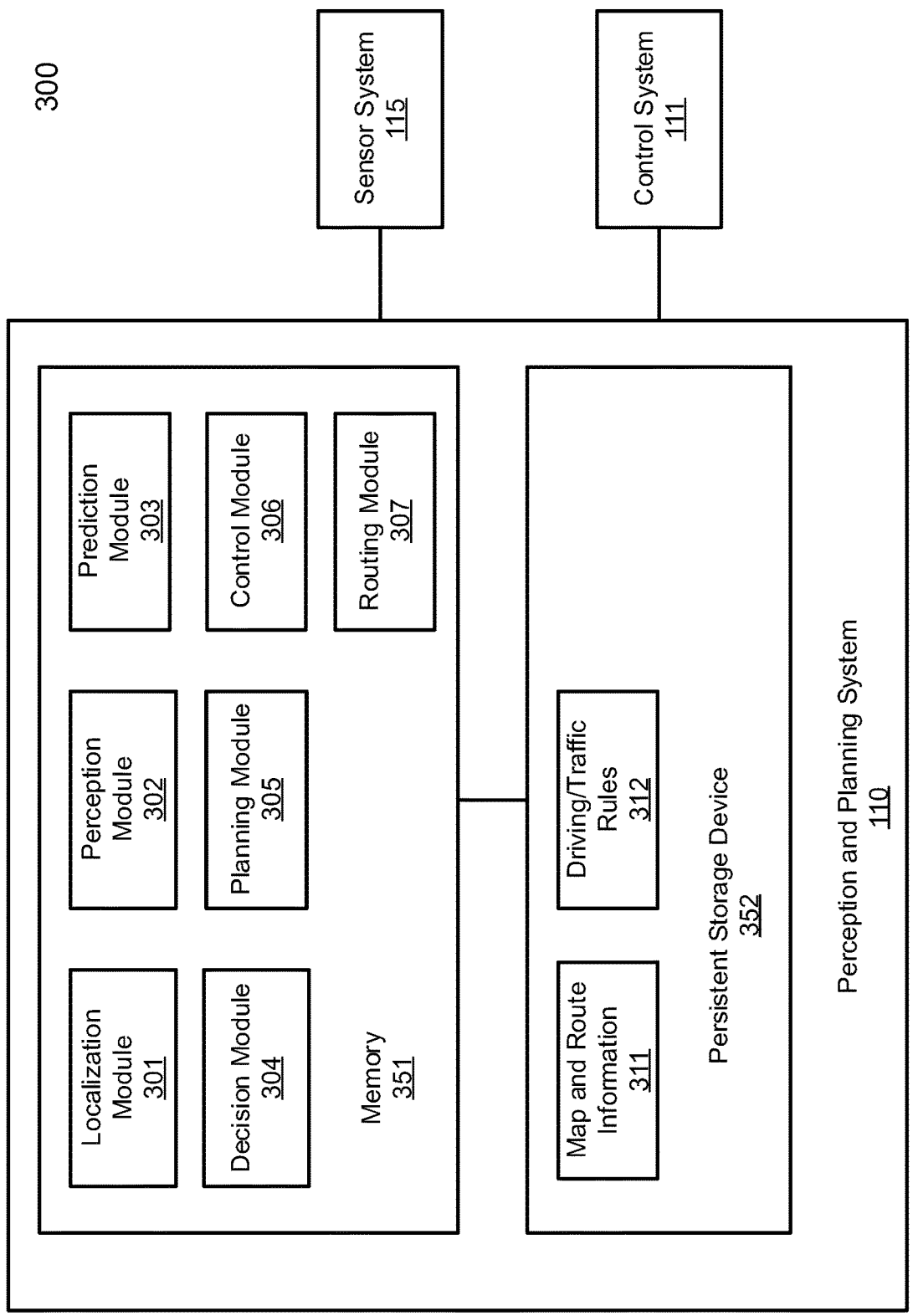
FIGS. 3A-3B are block diagrams illustrating an example of a perception and planning system used with an autonomous vehicle according to one embodiment.
Figure 3B:
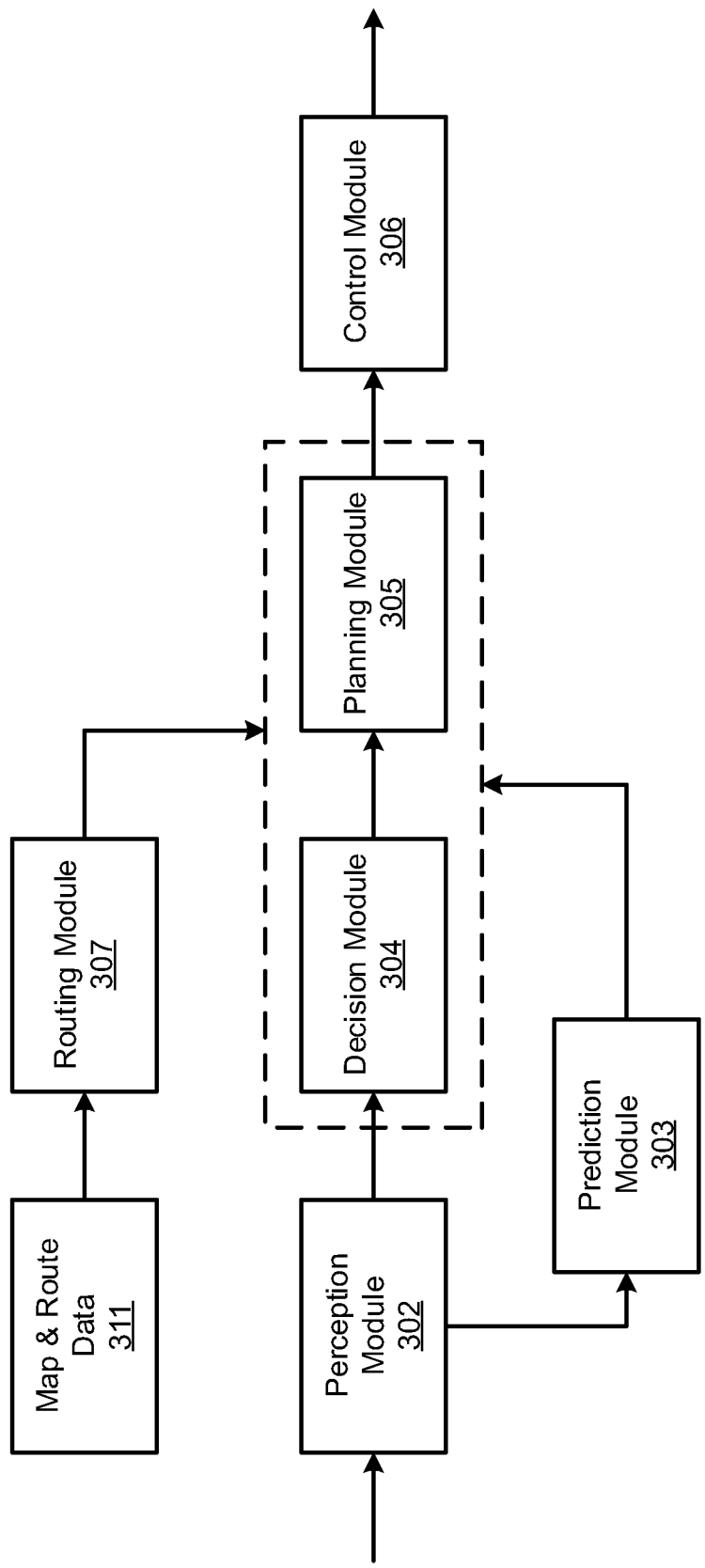

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, and routing module 307.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module.

Localization module 301 determines a current location of autonomous vehicle 300 (e.g., leveraging GPS units 212, 216) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection.

If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

The term of polynomial optimization or polynomial fit refers to the optimization of the shape of a curve this example. a trajectory) represented by a polynomial function (e.g., quintic or quartic polynomial functions), such that the curve is continuous along the curve e g a derivative at the joint of two adjacent segments is obtainable). In the field of autonomous driving, the polynomial curve from a starting point to an end point is divided into a number of segments (or pieces), each segment corresponding to a control point (or reference point). Such a segmented polynomial curve is referred to as a piecewise polynomial. When optimizing the piecewise polynomial, a set of joint constraints and a set of boundary constraints between two adjacent segments have to be satisfied, in addition to the set of initial state constraints and end state constraints.

The set of joint constraints includes positions (x, y), speed, heading direction, and acceleration of the adjacent segments have to be identical. For example, the ending position of a first segment (e.g., leading segment) and the starting position of a second segment (e.g., following segment) have to be identical or within a predetermined proximity. The speed, heading direction, and acceleration of the ending position of the first segment and the corresponding speed, heading direction, and acceleration of the starting position of the second segment have to be identical or within a predetermined range. In addition, each control point is associated with a predefined boundary (e.g., 0.2 meters left and right surrounding the control point). The polynomial curve has to go through each control point within its corresponding boundary. When these two set of constraints are satisfied during the optimization, the polynomial curve representing a trajectory should be smooth and continuous.

Figure 4A:
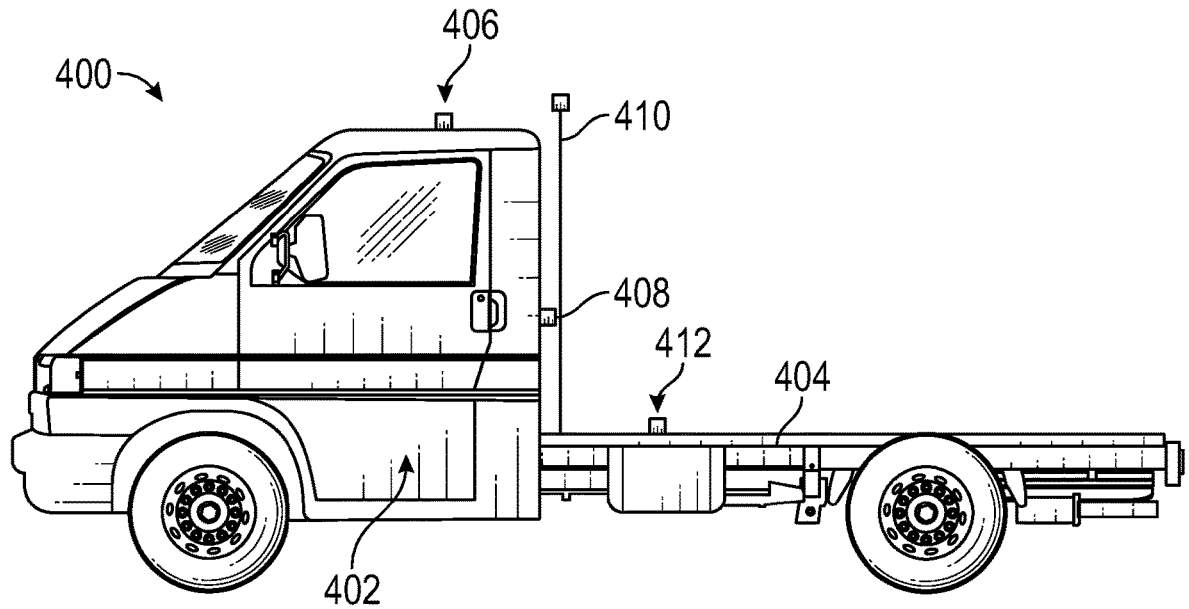
FIG. 4A is a side view of an autonomous driving truck having a set of IMUs and GPSs according to one embodiment.
Figure 4B:
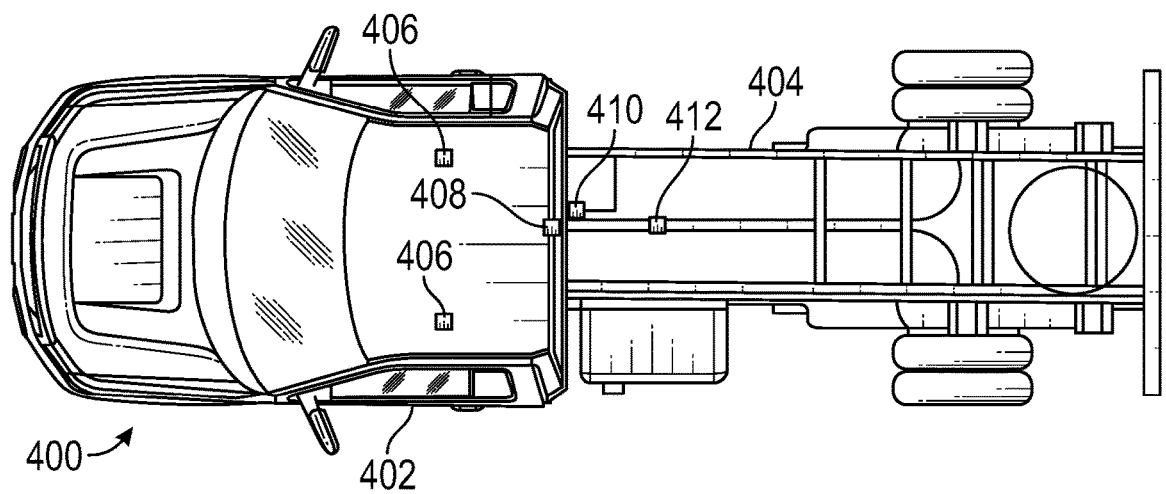
FIG. 4B is a top view of the autonomous driving truck shown in FIG. 4A having a set of IMUs and GPSs.

FIGS. 4A and 4B illustrate, respectively, a side view and a top view of an autonomous driving truck 400 according to one embodiment. Autonomous driving truck 400 includes a cabin 402, a body structure 404 which extends away generally horizontally from the cabin 402, and a cargo container (not shown) attached to the body structure 404. Autonomous driving truck 400 further includes a first inertial measurement unit (IMU) 408 attached ("mounted") to the cabin 402, a first global positioning system (GPS) 406 (e.g., two GPS sensors as shown in FIG. 4B) also attached to the cabin 402, a second inertial measurement unit 412 attached to the body structure 404 (e.g., baseboard or vehicle base platform), and a second global positioning system 410 also attached to the body structure 404.

In one embodiment, first GPS 406 is positioned higher than first IMU 408 as shown in FIG. 4A. In one embodiment, first GPS 406 is attached to an upper or top portion such as the roof of the cabin 402 and first IMU 408 is attached generally at the mid-section of the back of the cabin as shown in FIGS. 4A and 4B. In one embodiment, second GPS 410 is attached to the body structure 404 via a pole or other suitable supporting structure. In one embodiment, second IMU 412 is attached to the body structure 404 near the end of the body structure proximate to the cabin 402.

As shown in FIG. 4A, both of the first and second GPS units are positioned higher than the first and second IMU units to allow for better reception of GPS signals from, e.g., satellites or other network devices. First IMU 408 and first GPS 406 may correspond to IMU 213 and GPS 212, respectively, as shown in FIG. 2. Second IMU 412 and second GPS 410 may correspond to IMU 217 and GPS 216, respectively, also as shown in FIG. 2. According to one aspect of the present disclosure, the first set of position ("location") sensors (e.g., first IMU 408 and first GPS 406) and the second set of position sensors (e.g., second IMU 412 and second GPS 410) obtain both the positions of the cabin and body structures of the autonomous driving truck which allows the various modules (e.g., localization module 301, planning module 305, and control module 306 as shown in FIGS. 3A-3B) to use the position/location data obtained from these sensors based on their specific module requirements.

In one embodiment, sensor data obtained from first IMU 408 and first GPS unit 406 may be utilized by the perception module to perceive a driving environment surrounding the truck. Sensor data obtained from the first IMU, the second IMU, the first GPS unit, and the second GPS unit may be utilized by the planning module to plan a trajectory based on the perception information received from the perception module, generating planning and control data representing the trajectory. The control module processes and issues control commands based on the planning and control data, further in view of the location data determined based on sensor data obtained from the second IMU and the second GPS unit.

For example, the planning module and control modules, such as planning module 305 and control module 306 shown in FIGS. 3A-3B, may use the location data from the second set of position sensors as the real position of the autonomous driving truck since it is the body structure (e.g., body structure 404) that is actually being controlled and the movement of the cabin (e.g., cabin 402) can be generally ignored by the autonomous driving system. In another example, the control module (e.g. control module 306) may use the location data only from the second set of position sensors to control the steering of the autonomous driving truck. In other words, the location data from the first set of position sensors is not used by the control module to control the steering of the autonomous driving truck since the cabin may excessively roll and/or pitch relative to the body structure due to the suspension system of the autonomous driving truck when it is engaged in a turning operation on the road.

In accordance with another aspect of the present disclosure, the planning module (e.g., planning module 305) may use location data from both the first and second sets of position sensors to plan how the cabin and body structure move together. For example, it is useful to calculate the obstacle distance from both the cabin and the body structure. Also, using the location data from both the first and second sets of position sensors allows for determining a more accurate position of the autonomous driving truck which improves the planning functionality of the planning module. The planning module may also use one or more of the first set of position sensors (e.g., first IMU 408) to control the comfort in the cabin of the autonomous driving truck. Other modules such as a perception module (e.g., perception module 302 shown in FIG. 3A) and the driver operating system may use location data from one or both of the first and second sets of position sensors.

Figure 5:
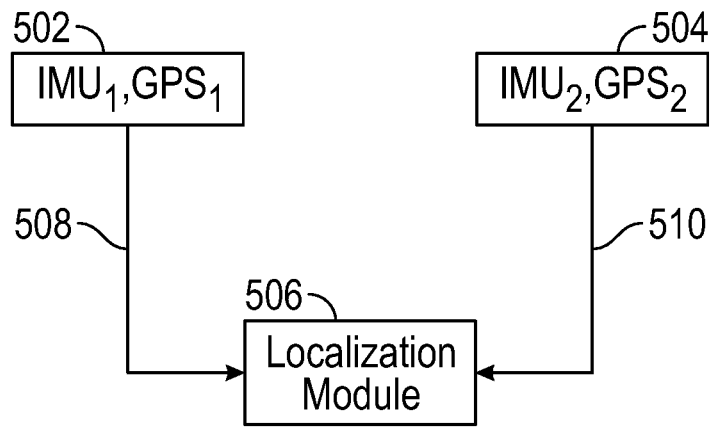
FIG. 5 is a block diagram of a localization module receiving location data from a set of IMU/GPS units according to one embodiment.

FIG. 5 is a block diagram of a localization module receiving location data from the two sets of IMU/GPS units according to one embodiment. $IMU_1$ and $GPS_1$ form a first set 502 of IMU/GPS units and $IMU_2$ and $GPS_2$ form a second set 504 of IMU/GPS units. $IMU_1$ may correspond to first IMU 408 and $GPS_1$ may correspond to first GPS 406 as shown in FIGS. 4A and 4B. In addition, $IMU_2$ may correspond to second IMU 412 and $GPS_2$ may correspond to second GPS 410 as also shown in FIGS. 4A and 4B. Localization module 506 may correspond to localization module 301 as shown in FIG. 3A. Each of the first set 502, second set 504, and localization module 506 may operate at a suitable frequency, for example, 100 Hz. The location data 508 from the first set 502 and the location data 510 from the second set 504 may not be received by the localization module 506 at the same time. For example, the location data 508 from the first set 502 of IMU/GPS units may be received at the localization module 506 at time $t_1$ (e.g., 5 ms) and the location data 510 from the second set 504 of IMU/GPS units may be received at the localization module 506 at time $t_2$ (e.g., 8 ms). Hence, the location data from the two sets 502 and 504 needs to be aligned at time $t_3$ and combined by the localization module 506 to send the location data at time $t_3$ to other modules (for example, planning module 305 and/or control module 306) at the same time. In one embodiment, the location data from $IMU_1$, the location data from $GPS_1$, the location data from $IMU_2$, and the location data from $GPS_2$, may all be aligned by localization module 506 at a defined time (e.g., time $t_3$) and the aligned location data is sent at time $t_3$ to planning module 305. In another embodiment, the location data from $IMU_2$ and the location data from $GPS_2$, may be aligned by localization module 506 at another defined time (e.g., time $t_4$) and the aligned location data is sent at time $t_4$ to control module 306. The other modules (e.g., planning module 305 and control module 306) may then use the location data received from the localization module as described above. The alignment of location data may be achieved using suitable techniques by the localization module, for example, by using interpolation techniques. In one aspect of the present disclosure, a time stamp may be included with every message from the first set 502, second set 504, and the localization module 506.

Figure 6:
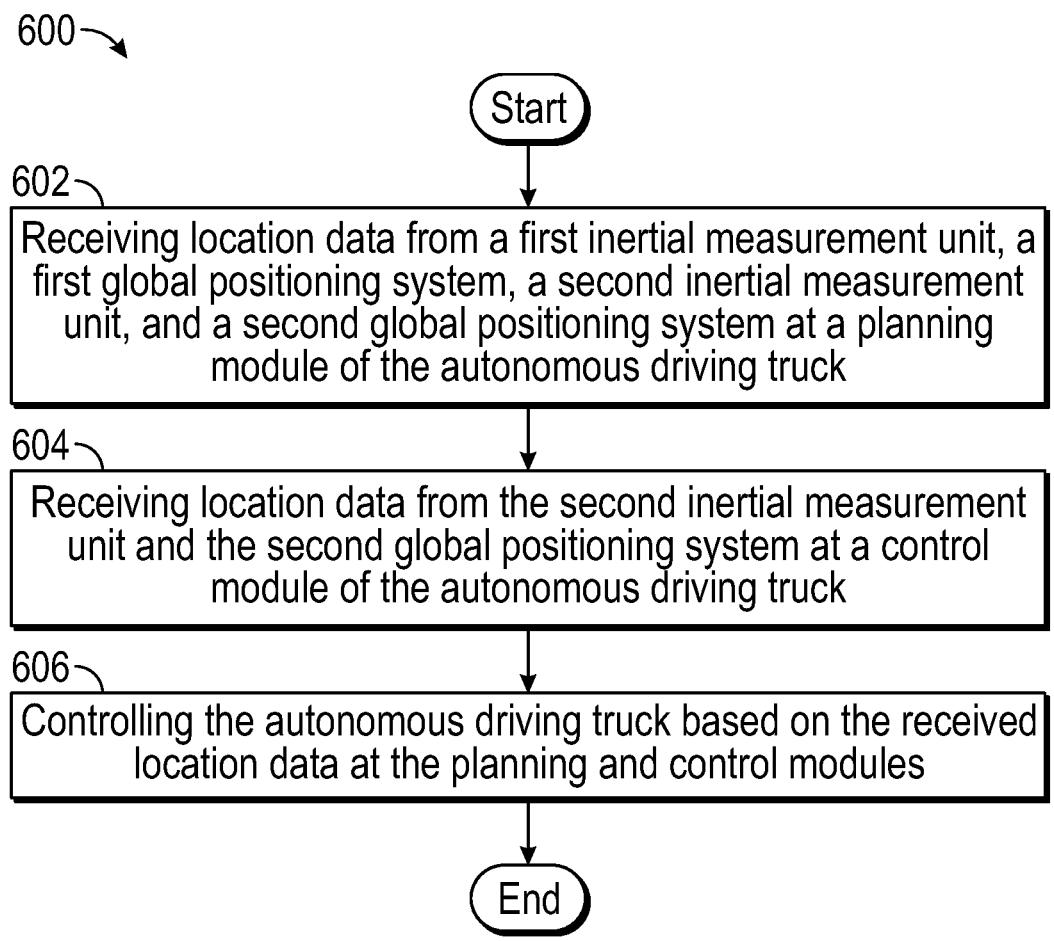
FIG. 6 is a flow diagram of a process of operating an autonomous driving truck according to one embodiment.

FIG. 6 is a flow diagram of a process 600 of operating an autonomous driving truck 400 (see FIGS. 4A, 4B) according to one embodiment. Process 600 may be performed by processing logic which may include software, hardware, or a combination thereof. For example, process 600 may be performed by a perception and planning system 110 shown in FIG. 3A. Referring to FIG. 6, in operation 602, processing logic is configured for receiving location data from a first inertial measurement unit (e.g., first IMU 408), a first global positioning system (e.g., first GPS 406), a second inertial measurement unit (e.g., second IMU 412), and a second global positioning system (e.g., second GPS 410) at a planning module (e.g., planning module 305) of the autonomous driving truck. In one embodiment, the first inertial measurement unit and the first global positioning system are attached to a cabin of the autonomous driving truck and the second inertial measurement unit and the second global positioning system are attached to a body structure of the autonomous driving truck in which the body structure extends away from the cabin. The process further includes, at operation 604, receiving location data from the second inertial measurement unit and the second global positioning system at a control module (e.g., control module 306) of the autonomous driving truck and at operation 606, controlling the autonomous driving truck based on the received location data at the planning and control modules.

In one embodiment, the process 600 may include prior to receiving the location data at the planning and control modules, receiving location data from the first and second inertial measurement units and the first and second global positioning systems initially at a localization module of the autonomous driving truck. In one embodiment, the process 600 may further include aligning, at the localization module, the location data received separately from each of the first and second inertial measurement units and the first and second global positioning systems. In one embodiment, the aligned location data may be sent at the same time from the localization module to other modules in the autonomous driving truck such as the planning and/or control modules. In one embodiment, the process 600 may further include receiving location data only from the second inertial measurement unit and the second global positioning system at the control module of the autonomous driving truck.

According to one aspect of the present disclosure, a sensor preprocessing (e.g., LIDAR) operation may include a mask operation which removes the master vehicle (e.g., autonomous driving truck 400) from the scanned obstacles. In one embodiment, the process 600 may further include forming a mask of the cabin based on location data from the first inertial measurement unit and the first global positioning system, forming a mask of the body structure based on location data from the second inertial measurement unit and the second global positioning system, and combining the masks to generate a final mask of the autonomous driving truck. The final mask may be used by the sensor preprocessing operation described above to remove the autonomous driving truck from the scanned obstacles using LIDAR. Such a masking operation may be performed by preprocessing operations by a perception module (e.g., perception module 302 shown in FIG. 3A). The sensors (e.g., LIDAR, radar, cameras) associated with the perception module may be mounted on the cabin of the autonomous driving truck and these sensors move together with the first IMU and first GPS as the autonomous driving truck is moving on a road. Hence, all obstacles observed by the perception module will be translated under a global coordinate system using the location data from the first IMU and first GPS units.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 7:
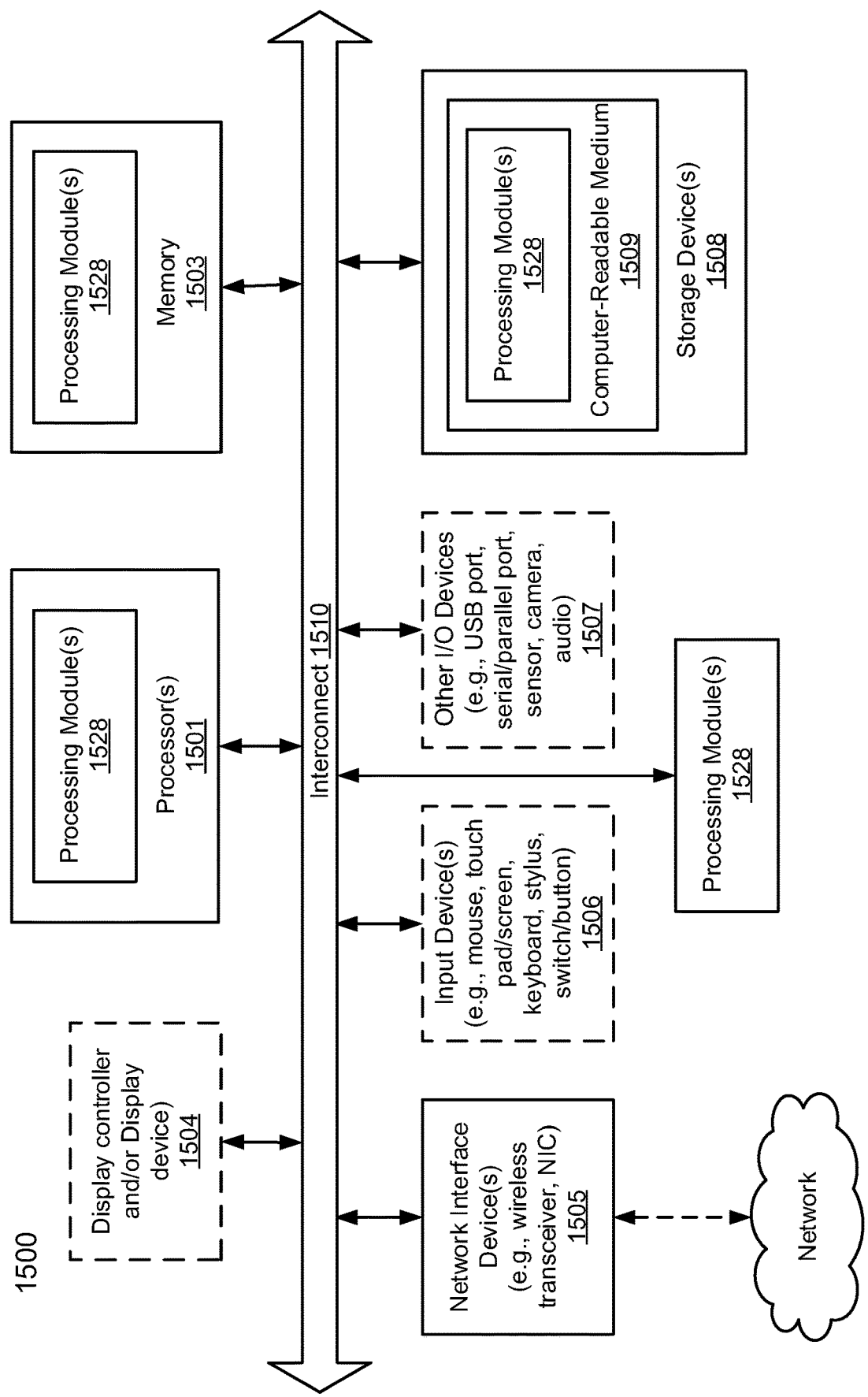
FIG. 7 is a block diagram illustrating a data processing system according to one embodiment.

FIG. 7 is a block diagram illustrating an example of a data processing system which may be used with one embodiment of the disclosure. For example, system 1500 may represent any of data processing systems described above performing any of the processes or methods described above, such as, for example, perception and planning system 110 or any of servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, planning module 305, control module 306, and localization module 301. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for operating an autonomous driving truck, the computer-implemented method comprising:
    generating first location data based on sensor data received from a first inertial measurement unit (IMU) and a first global positioning system (GPS) unit, wherein the first IMU and the first GPS unit are mounted on a first location of the autonomous driving truck;
    generating second location data based on sensor data received from a second IMU and a second GPS unit, wherein the second IMU and the second GPS unit are mounted on a second location of the autonomous driving truck;
    forming a first mask of a cabin based on the first location data associated with the first IMU and the first GPS unit;
    forming a second mask of a body structure based on the second location data associated with the second IMU and the second GPS unit;
    combining the first mask and the second mask to generate a final mask of the autonomous driving truck, wherein the final mask is utilized to remove the autonomous driving truck as an obstacle during perception;
    planning a trajectory based on the first location data and the second location data, generating planning and control data; and
    controlling the autonomous driving truck according to the trajectory, including issuing control commands based on the planning and control data in view of the second location data.

2. The computer-implemented method of claim 1, wherein the first IMU and the first GPS unit are attached to the cabin of the autonomous driving truck, and wherein the second IMU and the second GPS unit are attached to the body structure of the autonomous driving truck.

3. The computer-implemented method of claim 2, wherein the first IMU and the first GPS unit are attached to a top of the cabin of the autonomous driving truck, and wherein the second IMU and the second GPS unit are attached to a base platform of the autonomous driving truck.

4. The computer-implemented method of claim 1, further comprising:
    perceiving a driving environment surrounding the autonomous driving truck based on sensor data obtained from a LIDAR device and one or more camera, including perceiving one or more obstacles; and
    determining a relative location of each of the one or more obstacles relative to the autonomous driving truck in view of the first location data determined based on the first IMU and the first GPS unit, wherein the trajectory is generated based on relative locations of the one or more obstacles.

5. The computer-implemented method of claim 1, wherein the first GPS unit is positioned higher on the autonomous driving truck than the first IMU.

6. The computer-implemented method of claim 1, further comprising controlling a steering of the autonomous driving truck based on the second location data determined based on the second IMU and the second GPS unit.

7. The computer-implemented method of claim 1, wherein the autonomous driving truck uses the second location data as a real position of the autonomous truck.

8. A non-transitory machine-readable medium having instructions stored therein, which when executed by a processor, cause the processor to perform operations, the operations comprising:
generating first location data based on sensor data received from a first inertial measurement unit (IMU) and a first global positioning system (GPS) unit, wherein the first IMU and the first GPS unit are mounted on a first location of an autonomous driving truck;
generating second location data based on sensor data received from a second IMU and a second GPS unit, wherein the second IMU and the second GPS unit are mounted on a second location of the autonomous driving truck;
forming a first mask of a cabin based on the first location data associated with the first IMU and the first GPS unit;
forming a second mask of a body structure based on the second location data associated with the second IMU and the second GPS unit;
combining the first mask and the second mask to generate a final mask of the autonomous driving truck, wherein the final mask is utilized to remove the autonomous driving truck as an obstacle during perception;
planning a trajectory based on the first location data and the second location data, generating planning and control data; and
controlling the autonomous driving truck according to the trajectory, including issuing control commands based on the planning and control data in view of the second location data.

9. The non-transitory machine-readable medium of claim 8, wherein the first IMU and the first GPS unit are attached to the cabin of the autonomous driving truck, and wherein the second IMU and the second GPS unit are attached to the body structure of the autonomous driving truck.

10. The non-transitory machine-readable medium of claim 9, wherein the first IMU and the first GPS unit are attached to a top of the cabin of the autonomous driving truck, and wherein the second IMU and the second GPS unit are attached to a base platform of the autonomous driving truck.

11. The non-transitory machine-readable medium of claim 8, wherein the operations further comprise:
perceiving a driving environment surrounding the autonomous driving truck based on sensor data obtained from a LIDAR device and one or more camera, including perceiving one or more obstacles; and
determining a relative location of each of the one or more obstacles relative to the autonomous driving truck in view of the first location data determined based on the first IMU and the first GPS unit, wherein the trajectory is generated based on relative locations of the one or more obstacles.

12. The non-transitory machine-readable medium of claim 8, wherein the first GPS unit is positioned higher on the autonomous driving truck than the first IMU.

13. The non-transitory machine-readable medium of claim 8, wherein the operations further comprise controlling a steering of the autonomous driving truck based on the second location data determined based on the second IMU and the second GPS unit.

14. The non-transitory machine-readable medium of claim 8, wherein the autonomous driving truck uses the second location data as a real position of the autonomous truck.

15. A data processing system, comprising:
a processor; and
a memory coupled to the processor to store instructions, which when executed by the processor, cause the processor to perform operations, the operations including:
generating first location data based on sensor data received from a first inertial measurement unit (IMU) and a first global positioning system (GPS) unit, wherein the first IMU and the first GPS unit are mounted on a first location of an autonomous driving truck,
generating second location data based on sensor data received from a second IMU and a second GPS unit, wherein the second IMU and the second GPS unit are mounted on a second location of the autonomous driving truck,
forming a first mask of a cabin based on the first location data associated with the first IMU and the first GPS unit,
forming a second mask of a body structure based on the second location data associated with the second IMU and the second GPS unit,
combining the first mask and the second mask to generate a final mask of the autonomous driving truck, wherein the final mask is utilized to remove the autonomous driving truck as an obstacle during perception,
planning a trajectory based on the first location data and the second location data, generating planning and control data, and
controlling the autonomous driving truck according to the trajectory, including issuing control commands based on the planning and control data in view of the second location data.

16. The data processing system of claim 15, wherein the first IMU and the first GPS unit are attached to the cabin of the autonomous driving truck, and wherein the second IMU and the second GPS unit are attached to the body structure of the autonomous driving truck.

17. The data processing system of claim 16, wherein the first IMU and the first GPS unit are attached to a top of the cabin of the autonomous driving truck, and wherein the second IMU and the second GPS unit are attached to a base platform of the autonomous driving truck.

18. The data processing system of claim 15, wherein the operations further comprise:
perceiving a driving environment surrounding the autonomous driving truck based on sensor data obtained from a LIDAR device and one or more camera, including perceiving one or more obstacles; and
determining a relative location of each of the one or more obstacles relative to the autonomous driving truck in view of the first location data determined based on the first IMU and the first GPS unit, wherein the trajectory is generated based on relative locations of the one or more obstacles.

19. The data processing system of claim 15, wherein the first GPS unit is positioned higher on the autonomous driving truck than the first IMU.

20. The data processing system of claim 15, wherein the operations further comprise controlling a steering of the autonomous driving truck based on the second location data determined based on the second IMU and the second GPS unit.

21. The data processing system of claim 15, wherein the autonomous driving truck uses the second location data as a real position of the autonomous truck.

\* \* \* \* \*